US009995311B2

(12) United States Patent
Son et al.

(10) Patent No.: US 9,995,311 B2
(45) Date of Patent: Jun. 12, 2018

(54) CENTRIFUGAL FAN

(71) Applicant: LG ELECTRONICS INC., Seoul (KR)

(72) Inventors: Sang Yuk Son, Changwon-si (KR); Choon Myun Chung, Changwon-si (KR); Tae Man Yang, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 14/443,116

(22) PCT Filed: May 9, 2014

(86) PCT No.: PCT/KR2014/004158
§ 371 (c)(1),
(2) Date: May 15, 2015

(87) PCT Pub. No.: WO2014/182124
PCT Pub. Date: Nov. 13, 2014

(65) Prior Publication Data
US 2015/0308452 A1 Oct. 29, 2015

(30) Foreign Application Priority Data

May 10, 2013  (KR) .................. 10-2013-0053262
Apr. 3, 2014   (KR) .................. 10-2014-0040179

(51) Int. Cl.
*F04D 29/28* (2006.01)
*B21K 3/04* (2006.01)
(Continued)

(52) U.S. Cl.
CPC ............ *F04D 29/281* (2013.01); *B21D 11/20* (2013.01); *B21J 5/00* (2013.01); *B21K 3/04* (2013.01);
(Continued)

(58) Field of Classification Search
CPC ......... F05D 2240/301; F05D 2240/303; F05D 2240/304; F05D 29/281; F05D 29/282; F05D 29/30; F05D 29/441; F05D 29/626
See application file for complete search history.

(56) References Cited

U.S. PATENT DOCUMENTS 1,147,915 A     3/1923   Watkins
2,779,424 A  *  1/1957   Lyon .................... F04D 29/326
                                                         29/889.4
(Continued)

FOREIGN PATENT DOCUMENTS

CN    1327129    12/2001
CN    1712733    12/2005
(Continued)

OTHER PUBLICATIONS

European Search Report dated Sep. 30, 2015.
(Continued)

*Primary Examiner* — Igor Kershteyn
*Assistant Examiner* — Eric Zamora Alvarez
(74) *Attorney, Agent, or Firm* — Ked & Associates LLP

(57) ABSTRACT

A centrifugal fan is provided that includes a main plate configured to be rotated about a rotational axis, a shroud, having a suction opening, and a plurality of blades arranged in a circumferential direction between the main plate and the shroud to allow air suctioned in through the suction opening to flow from a front edge to a rear edge of each blade. Assuming a first cross section, a second cross section, a third cross section, and a fourth cross section of each blade sequentially taken at layers from the shroud to the main plate, a front edge of the first cross section is located farther from the rotational axis than a front edge of the fourth cross
(Continued)

section, and a rear edge of the first cross section is located closer to the rotational axis than a rear edge of the fourth cross section.

24 Claims, 9 Drawing Sheets

(51) Int. Cl.
| | |
|---|---|
| *B21J 5/00* | (2006.01) |
| *B21D 11/20* | (2006.01) |
| *B23K 11/11* | (2006.01) |
| *F04D 29/44* | (2006.01) |
| *F04D 17/10* | (2006.01) |
| *F04D 29/30* | (2006.01) |
| *B23K 11/16* | (2006.01) |
| *B23K 26/32* | (2014.01) |
| *B23K 11/00* | (2006.01) |
| *B23K 26/244* | (2014.01) |
| *F04D 29/62* | (2006.01) |
| *B23K 101/00* | (2006.01) |
| *B23K 103/04* | (2006.01) |

(52) U.S. Cl.
CPC .......... *B23K 11/0026* (2013.01); *B23K 11/11* (2013.01); *B23K 11/115* (2013.01); *B23K 11/16* (2013.01); *B23K 26/244* (2015.10); *B23K 26/32* (2013.01); *F04D 17/10* (2013.01); *F04D 29/282* (2013.01); *F04D 29/30* (2013.01); *F04D 29/441* (2013.01); *F04D 29/626* (2013.01); *B23K 2201/001* (2013.01); *B23K 2203/04* (2013.01); *Y10T 29/49329* (2015.01)

(56) References Cited

U.S. PATENT DOCUMENTS

| | | | |
|---|---|---|---|
| 3,144,204 | A | 8/1964 | Bohanon |
| 3,272,429 | A | 9/1966 | Wood |
| 4,236,871 | A | 12/1980 | Hirst et al. |
| 4,874,293 | A | 10/1989 | Gutzwiller |
| 4,971,521 | A | 11/1990 | Atarashi et al. |
| 5,209,639 | A | 5/1993 | Neuber et al. |
| 5,249,927 | A | 10/1993 | Vera |
| 5,336,050 | A | 8/1994 | Guida et al. |
| 5,800,128 | A | 9/1998 | Bodmer et al. |
| 6,039,539 | A | 3/2000 | Berg |
| 6,156,090 | A | 12/2000 | Ishikawa et al. |
| 6,220,819 | B1 | 4/2001 | Chien et al. |
| 6,368,062 | B1 | 4/2002 | Yagami et al. |
| 8,007,240 | B2 | 8/2011 | Sanagi et al. |
| 8,454,316 | B2 | 6/2013 | Svensson |
| 8,668,460 | B2 | 3/2014 | Han et al. |
| 2006/0228212 | A1 | 10/2006 | Sadi |
| 2007/0098556 | A1 | 5/2007 | Sanagi et al. |
| 2010/0202886 | A1* | 8/2010 | Iwata ............... F04D 29/282 416/182 |
| 2011/0023526 | A1* | 2/2011 | Ohyama .......... F04D 29/281 62/426 |
| 2012/0055656 | A1 | 3/2012 | Han et al. |

FOREIGN PATENT DOCUMENTS

| | | |
|---|---|---|
| CN | 1756908 | 4/2006 |
| CN | 1802512 | 7/2006 |
| CN | 201265533 | 7/2009 |
| CN | 101715518 | 5/2010 |
| CN | 101821513 | 9/2010 |
| CN | 101960150 | 1/2011 |
| CN | 101990604 | 3/2011 |
| CN | 102834220 | 12/2012 |
| CN | 102927044 | 2/2013 |
| EP | 0 133 845 | 3/1985 |
| EP | 2 275 689 | 1/2011 |
| GB | 18349 | 6/1911 |
| GB | 796696 | 6/1958 |
| JP | 55-35169 | 3/1980 |
| JP | 57-35199 | 2/1982 |
| JP | 5-305376 | 11/1993 |
| JP | 2000-045997 A | 2/2000 |
| JP | 2001-100812 A | 10/2001 |
| JP | 2002-235695 A | 8/2002 |
| JP | 3111526 | 7/2005 |
| JP | 2007-205269 | 8/2007 |
| JP | 2008-002379 A | 1/2008 |
| JP | 2009-150380 | 7/2009 |
| JP | 2010-053803 | 3/2010 |
| JP | 2011-058442 A | 3/2011 |
| JP | 2011-208501 | 10/2011 |
| JP | 2011-226448 A | 11/2011 |
| KR | 10-2006-0008988 A | 1/2006 |
| KR | 10-2010-0066561 A | 6/2010 |
| KR | 10-2010-0134011 | 10/2010 |
| KR | 20-2010-0010533 | 10/2010 |
| KR | 10-2012-0023320 A | 3/2012 |
| TW | I285706 | 8/2007 |
| WO | WO 2008/129475 | 10/2008 |

OTHER PUBLICATIONS

European Search Report dated Nov. 19, 2015.
European Search Report dated Jan. 27, 2016.
Korean Office Action dated Mar. 24, 2016.
Chinese Office Action dated May 4, 2016. (201480003049.0) (translation).
Chinese Office Action dated May 4, 2016 (201480002996.8) (translation).
Chinese Office Action dated Jun. 21, 2016 (translation).
Chinese Office Action dated Jul. 5, 2016 (translation).
European Search Report dated Sep. 9, 2016 issued in Application No. EP 14771179.0.
Korean Office Action dated Oct. 15, 2016 issued in Application No. 10-2014-0040179.
Korean Office Action dated Jan. 24, 2017.
U.S. Appl. No. 14/443,198, filed May 15, 2015.
U.S. Appl. No. 14/443,116, filed May 15, 2015.
U.S. Appl. No. 14/443,196, filed May 15, 2015.
International Search Report dated Sep. 4, 2014 issued in Application No. PCT/KR2014/003920.
International Search Report dated Sep. 16, 2014 issued in Application No. PCT/KR2014/004152.
International Search Report issued in Application No. PCT/KR2014/004162 dated Sep. 16, 2014.
United States Office Action dated Jun. 7, 2017 issued in co-pending related U.S. Appl. No. 14/443,198.
International Search Report issued in Application No. PCT/KR2014/004158 dated Sep. 15, 2014.
Korean Office Action dated Mar. 7, 2017 issued in Application No. 10-2017-0026942.

* cited by examiner

CENTRIFUGAL FAN

This application claims priority to International Patent Application No. PCT/KR2014/004158, filed on May 9, 2014, which claims priority to Korean Application Nos. KR 2013-0053262 and KR 2014-004179 filed in Korea on May 10, 2013 and Apr. 3, 2014, respectively, whose entire disclosures are hereby incorporated by reference.

BACKGROUND

1. Field

A centrifugal fan is disclosed herein.

2. Background

A centrifugal fan is a fan that accelerates air introduced in an axial direction through a shroud and discharges the air in a radial direction through gaps between blades. Performance of the centrifugal fan is affected by various shape factors, as well as friction loss, shock loss and the like. Representative examples of factors having an effect on the performance of the centrifugal fan include a speed of the centrifugal fan, the shape, angle or number of blades, and the shape of a shroud.

Among the aforementioned factors, in particular, the shape of blades is important because it may contribute to enhancement in the performance of the centrifugal fan without a great change in an entire size or standard of the centrifugal fan. In recent years, studies to acquire desired performance by changing the shape of blades in various ways have been actively conducted.

Japanese Patent Laid-open Publication No. 2000-45997 discloses a blade formed by bending a single metal sheet. In the above patent, the blade formed by bending a single metal sheet has an airfoil cross section. More particularly, the blade has a three dimensional shape in which a leading edge of the blade has a prescribed inclination relative to a rotational axis of a centrifugal fan and a trailing edge of the blade is parallel to the rotational axis. However, as exemplarily shown in the above patent, respective airfoil cross sections of the blade taken at arbitrary layers perpendicular to the rotational axis have a common camber line. For example, although a lower edge of the blade bonded to a main plate has the longest camber line and an upper edge of the blade coming into contact with a shroud has the shortest camber line, the camber line at the upper edge completely overlaps the camber line at the lower edge. In the blade having the above-described shape, since inlet angles for outlet angles) at respective cross sections are substantially the same, enhancement in efficiency of the fan is limited, and in particular, it is difficult to compensate for a difference of flow characteristics between an upper portion and a lower portion of the blade.

It is one object to provide a centrifugal fan capable of achieving enhanced performance via improvement in the shape of a blade.

It is another object to provide a centrifugal fan capable of being applied to lamer products than in the related art.

It is another object to provide a centrifugal fan capable of achieving reduced flow resistance, more particularly, enhanced efficiency via improvement in the shape of a blade.

It is another object to provide a centrifugal fan capable of discharging an even volume of air from a shroud and from a main plate.

It is another object to provide a centrifugal fan capable of increasing static pressure beyond that in the related art.

It is another object to provide a centrifugal fan in which an upper portion of a blade includes a section that is concave toward a rotation axis and a lower portion of the blade includes a section that is convex in a direction opposite to the rotation axis, whereby airflow at the lower portion of the blade is reinforced and even airflow between the upper and lower portions of the blade is accomplished.

It is another object to provide a centrifugal fan capable of reducing noise.

It is a further object of to provide, a centrifugal fan capable of restricting flow separation from a rear edge of a blade.

In accordance with one embodiment, the above and other objects can be accomplished by the provision of a centrifugal fan including a main plate configured to be rotated about a rotation axis, a shroud having a suction opening through which air is suctioned, and a plurality of blades arranged in a circumferential direction between the main plate and the shroud to allow the air suctioned through the suction opening to flow from a front edge to a rear edge of each blade, wherein, assuming a first cross section, a second cross section, a third cross section and a fourth cross section of each blade sequentially taken at layers from the shroud to the main plate, a front edge of the first cross section is located farther from the rotation axis than a front edge of the fourth cross section, and a rear edge of the first cross section is located closer to the rotation axis than a rear edge of the fourth cross section, and wherein, among rear edges of the respective cross sections, the rear edge of the second cross section is located farthest away from the rotation axis and the rear edge of the third cross section is closest to the rotation axis.

The front edge of the first cross section of the blade may be located ahead of the front edge of the fourth cross section in a direction opposite to a rotation direction of the main plate. Among front edges of the respective cross sections, the from edge of the first cross section may be located at the foremost position in the direction opposite to the rotation direction of the main plate.

The rear edge of the first cross section may be located ahead of the rear edge of the fourth cross section in the direction opposite to the rotation direction of the main plate. Among the respective cross sections of the blade, the rear edge of the first cross section may be located at the foremost position in the direction opposite to the rotation direction of the main plate.

The front edge of the third cross section of the blade may be located ahead of the front edge of the fourth cross section in a rotation direction of the main plate. The rear edge of the third cross section of the blade may be located ahead of the rear edge of the fourth cross section in the rotation direction of the main plate.

An angle between a straight line interconnecting the front edge and the rear edge of the blade and a straight line interconnecting the rear edge and the rotation axis may have a maximum value at the first cross section among the respective cross sections.

When the respective cross sections of the blade are projected onto a common projection plane in a direction of the rotation axis, a straight line interconnecting the front edge and the rear edge of the first cross section may cross all straight lines interconnecting the front edges and the rear edges of the respective cross sections.

The first cross section may meet the shroud at the rear edge thereof.

The fourth cross section may be a portion of the blade where the blade meets the main plate.

A cross section of the blade between the front edge and the rear edge thereof may take the form of an airfoil.

In accordance with another embodiment, a centrifugal fan including a main plate configured to be rotated about a rotation axis, a shroud having a suction opening through which air is suctioned, and a plurality of blades arranged in a circumferential direction between the main plate and the shroud to allow the air suctioned through the suction opening to flow from a front edge to a rear edge of each blade, wherein, assuming a first cross section, a second cross section, a third cross section and a fourth cross section of each blade sequentially taken at planar layers, perpendicular to the rotation axis, from the shroud to the main plate, the rear edge of the blade between the first cross section and the second cross section gradually becomes farther away from the rotation axis, the rear edge of the blade between the second cross section and the third cross section gradually approaches the rotation axis, and the rear edge of the blade between the third cross section and the fourth cross section again gradually becomes farther away from the rotation axis.

Among rear edges of the respective cross sections, the rear edge of the second cross section may be located farthest away from the rotation axis.

Among rear edges of the respective cross sections, the rear edge of the third cross section may be located at the foremost position in a rotation direction of the main plate.

Among rear edges of the respective cross sections, the rear edge of the first cross section may be located at the foremost position in a direction opposite to a rotation direction of the main plate.

A distance between the second cross section and the third cross section may be greater than a distance between the first cross section and the second cross section.

In accordance with a further embodiment, a centrifugal fan including a main plate configured to be rotated about a rotation axis, a shroud having a suction opening through which air is suctioned, and a plurality of blades arranged in a circumferential direction between the main plate and the shroud to allow the air suctioned through the suction opening to flow from a front edge to a rear edge of each blade, wherein a longitudinal cross section of the blade taken in a direction of the rotation axis is convex in a direction opposite to the rotation axis at a portion of the blade near the shroud and is convex toward the rotation axis at a portion of the blade near the main plate.

The blade may include a portion in which the front edge becomes farther away from the rotation axis with decreasing distance to the shroud.

Assuming prescribed two cross sections sequentially taken at planar layers, perpendicular to the rotation axis, from the shroud to the main plate, the two cross sections projected onto a prescribed projection plane along the rotation axis may cross each other. Among the two cross sections of the blade, one cross section closer to the shroud than the other cross section may further cross a cross section having the longest distance from a rear edge thereof to the rotation axis included in the portion that is convex in the direction opposite to the rotation axis and a cross section having the shortest distance from a rear edge thereof to the rotation axis included in the portion that is convex toward the rotation axis. Among the two cross sections of the blade, a front edge of the cross section closer to the shroud may be located farther from the rotation axis than a front edge of the other cross section closer to the main plate, and the rear edge of the cross section closer to the shroud may be located closer to the rotation axis than the rear edge of the other cross section closer to the main plate. The rear edge of the cross section closer to the shroud may be located ahead of the rear edge of the other cross section closer to the main plate in a direction opposite to a rotation direction of the main plate.

The blade may include a positive pressure surface forming member configured to form a positive pressure surface and a negative pressure surface forming member configured to form a negative pressure surface.

According to embodiments, a centrifugal fan has the effect of achieving enhanced performance through improvement in the shape of a blade. In particular, the centrifugal fan has the effect of achieving enhanced efficiency owing to less flow resistance than in the related art.

In addition, through enhancement in the efficiency of the fan, lower speed operation of the centrifugal fan than in the related art on the basis of the same air volume is possible. This has the effect of facilitating application of the centrifugal fan to large products.

In addition, as a portion of the blade close to a shroud and a portion of the blade close to a main plate have different shapes, it is possible to deal with different airflow characteristics between the blade portion close to the shroud and the blade portion close to the main plate in an optimized manner. This has the effect of enhancing the efficiency of the fan. Furthermore, the centrifugal fan has the effect of achieving a more even air velocity at the shroud and at the main plate than in the related art and, consequently, achieving noise reduction.

In addition, the centrifugal fan has the effect of increasing static pressure beyond that in the related art.

In addition, the centrifugal fan has the effect of implementing lower speed operation than in the related art on the basis of the same air volume In addition, the centrifugal fan has the effect of achieving an even air volume between an upper portion and a lower portion of the blade via guidance of airflow to the main plate and reinforcing airflow to a negative pressure surface at the upper portion of the blade, thereby restricting flow separation.

In addition, the centrifugal fan has the effect of preventing flow separation at a rear edge of the blade, more particularly, at a portion of the blade close to the shroud.

DETAILED DESCRIPTION

Advantages and features and a method of achieving the same will be more clearly understood from embodiments described below in detail with reference to the accompanying drawings. However, embodiments are not limited to the following embodiments and may be implemented in various different forms. The embodiments are provided merely to complete disclosure and to provide those skilled in the art with the category of the invention. The invention is defined only by the claims. Wherever possible, the same reference numbers will be used throughout the specification to refer to the same or like parts.

Figure 1:
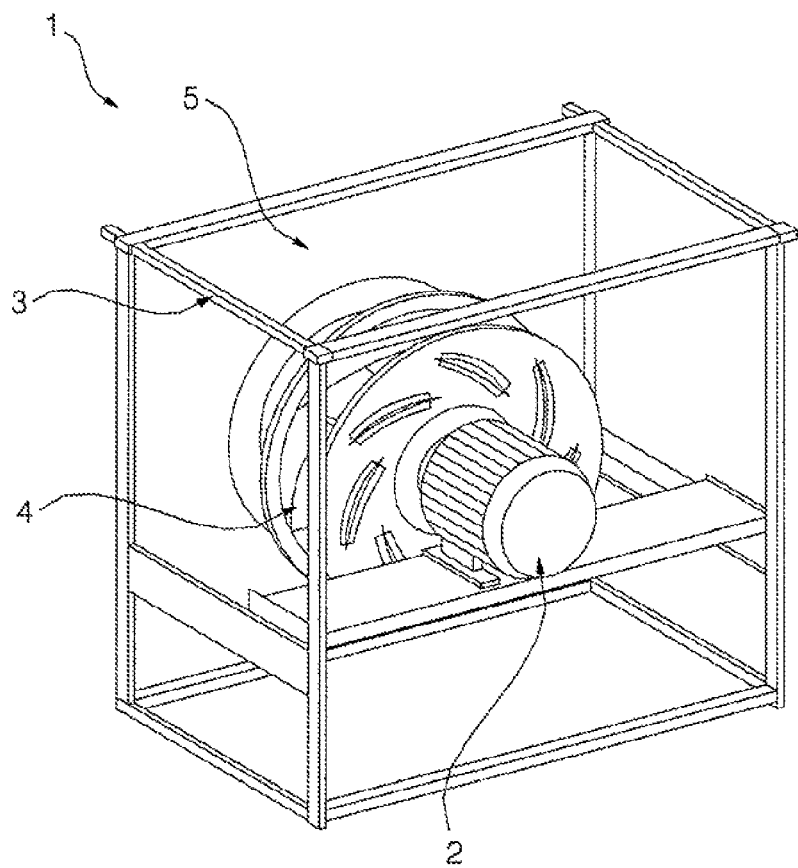
FIG. 1 is a view showing one example of a fan module usable with a centrifugal fan.

FIG. 1 is a view showing one example of a fan module usable with a centrifugal fan. The centrifugal fan according to embodiments that will be described hereinafter may be applied to refrigerators, air conditioners, cleaners and the like. The centrifugal fan may be installed without a duct because it provides natural introduction and discharge of air into and from a fan. In particular, the centrifugal fan may be applied to a fan module for use in an air conditioner which is installed at an outdoor place as exemplarily shown in FIG. 1 and serves to cool or heat air directed from an indoor space and then resupply the air into the indoor space. The fan module 1 as described above includes a motor 2 having a rotational shaft, a support frame 3 supporting the motor 2 and a centrifugal fan 4 coupled to the rotational shaft of the motor 2. In addition, a front panel 5 coupled to a front surface of the support frame 3 has an opening through which air can be introduced into the centrifugal fan 4. The air introduced in a longitudinal direction of the rotational shaft through the opening is discharged in a radial direction from a rear region of the front panel 5 as the centrifugal fan 4 is rotated.

Figure 2:
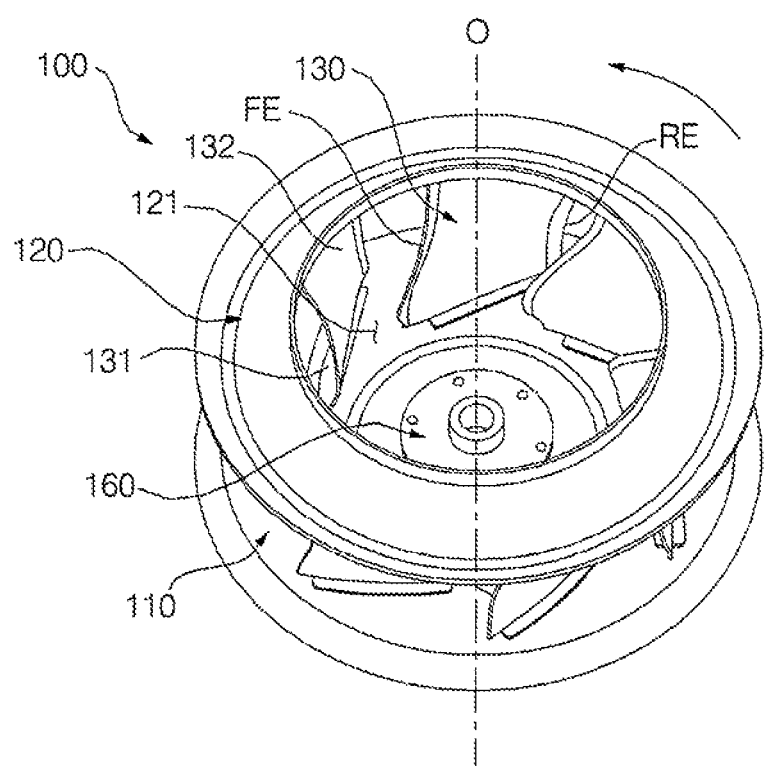
FIG. 2 is a perspective view showing a centrifugal fan according to one embodiment.
Figure 3:
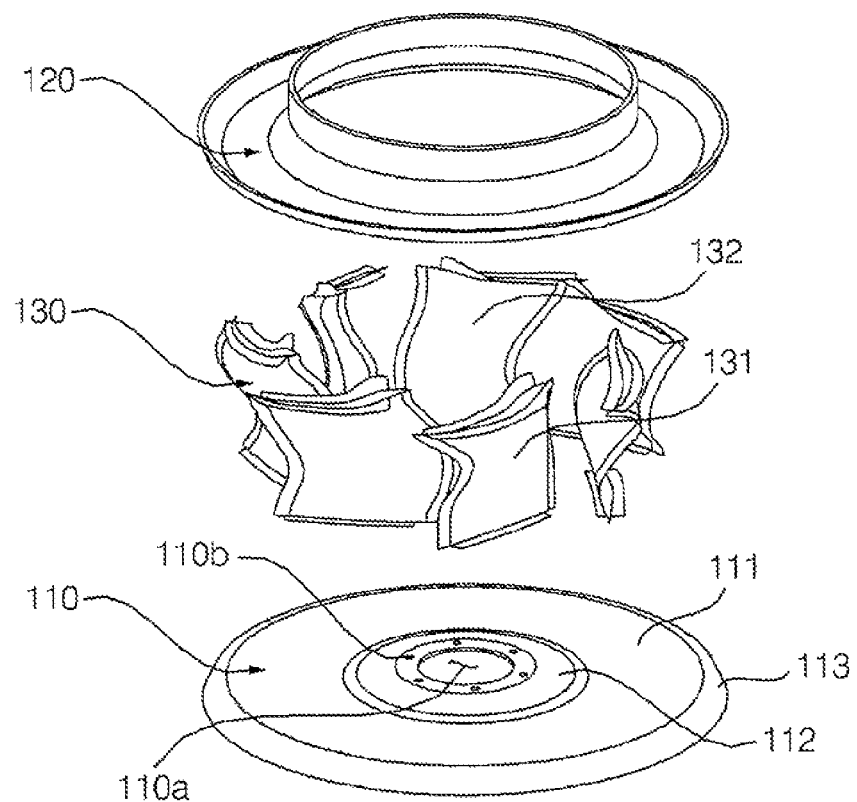
FIG. 3 is an exploded perspective view of the centrifugal fan shown in FIG. 2.
Figure 4:
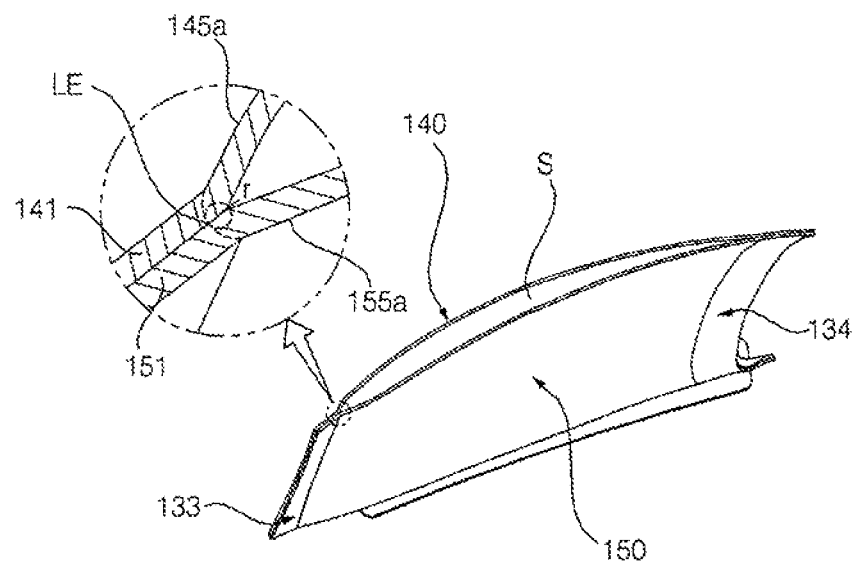
FIG. 4 is a transverse cut-away view of a blade.
Figure 5:
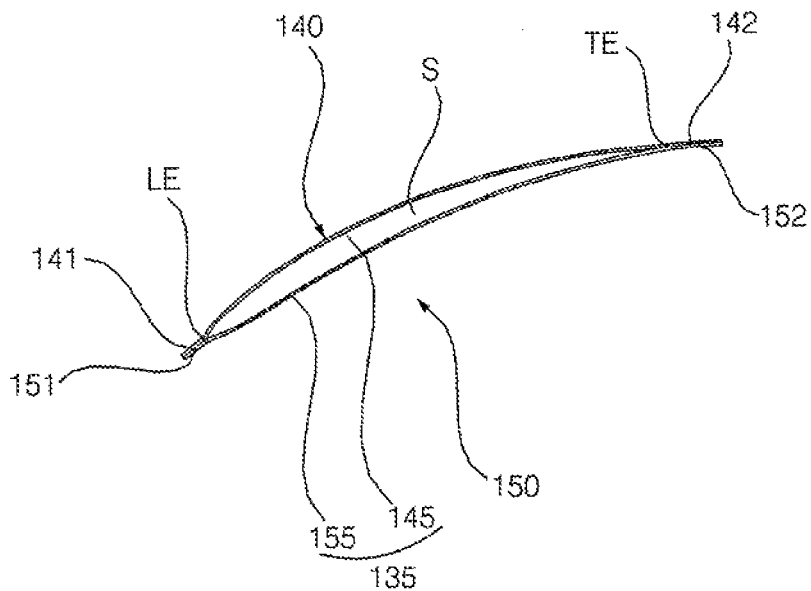
FIG. 5 is a transverse sectional view of the blade.
Figure 6:
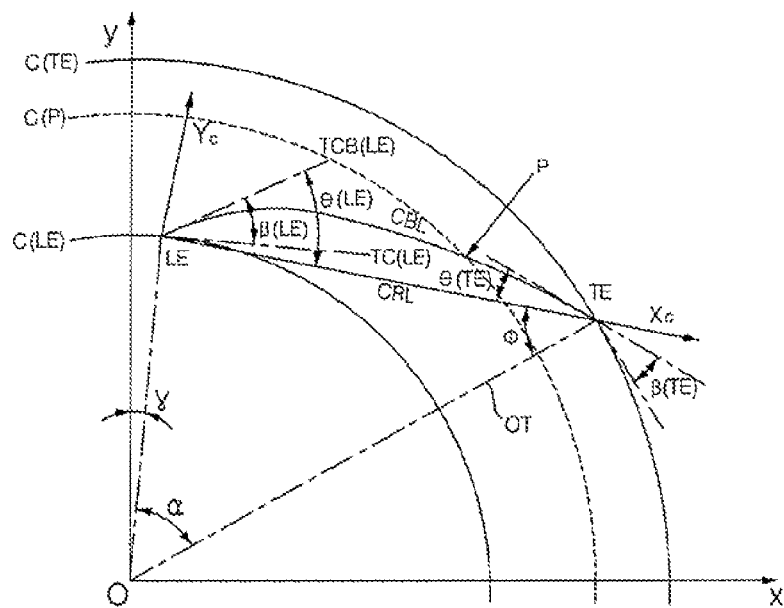
FIG. 6 is a view showing main factors to define a cross sectional shape and an attachment structure of the blade.
Figure 7:
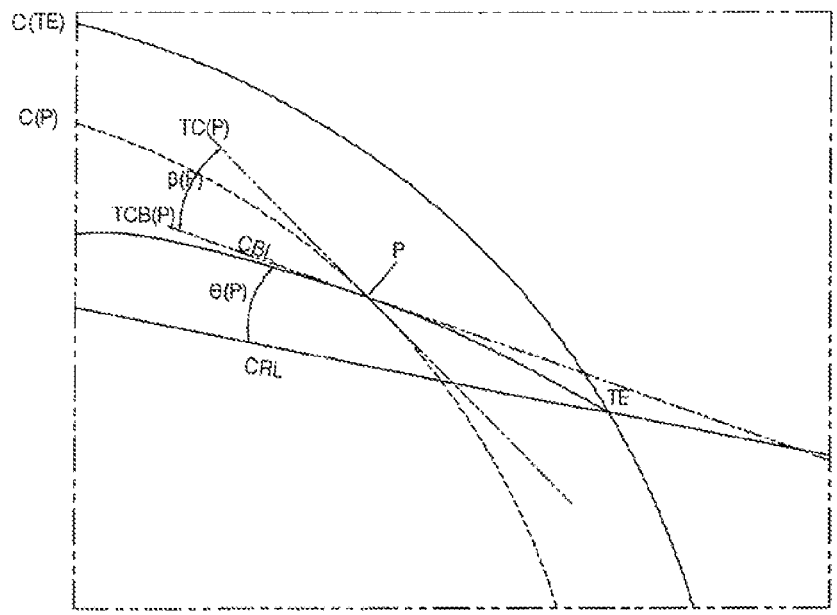
FIG. 7 is a view showing factors defined at a point P on a camber line with reference to FIG. 6.
Figure 8A:
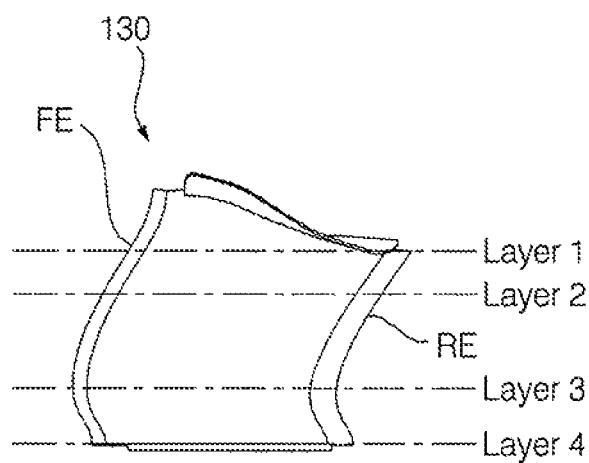
FIGS. 8A-8B are a view showing positions of layers marked at the blade in (a) and cross sections of the blade taken at the layers.
Figure 8B:
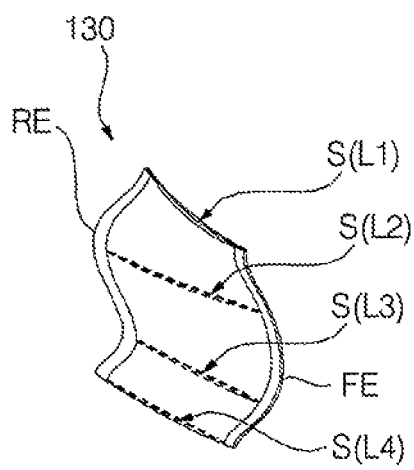
Figure 9:
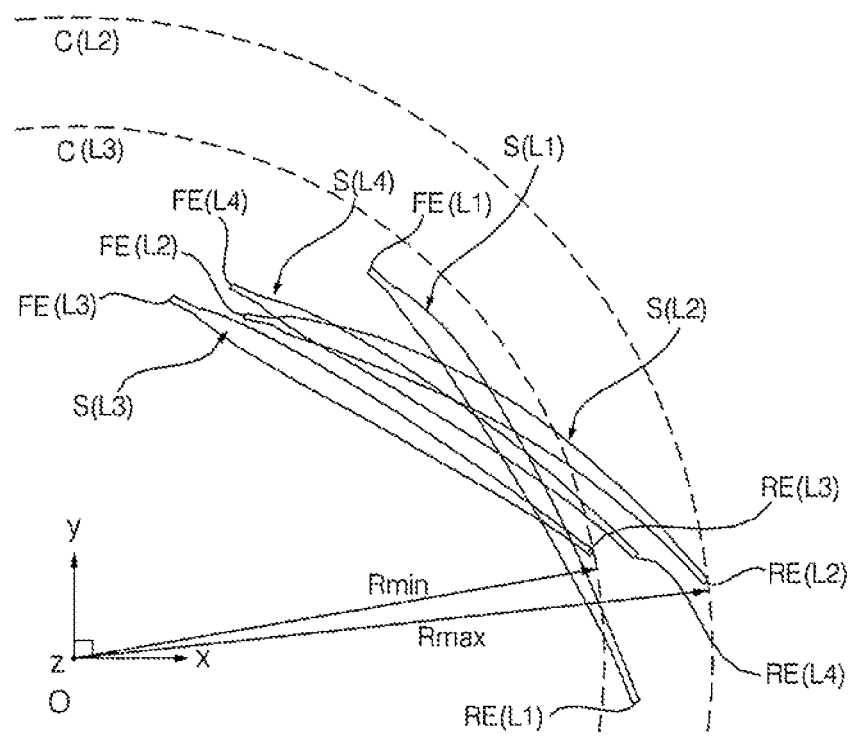
FIG. 9 is a view showing the cross sections of FIGS. 8A-8B projected onto a single plane in a direction of a rotational axis.
Figure 10:
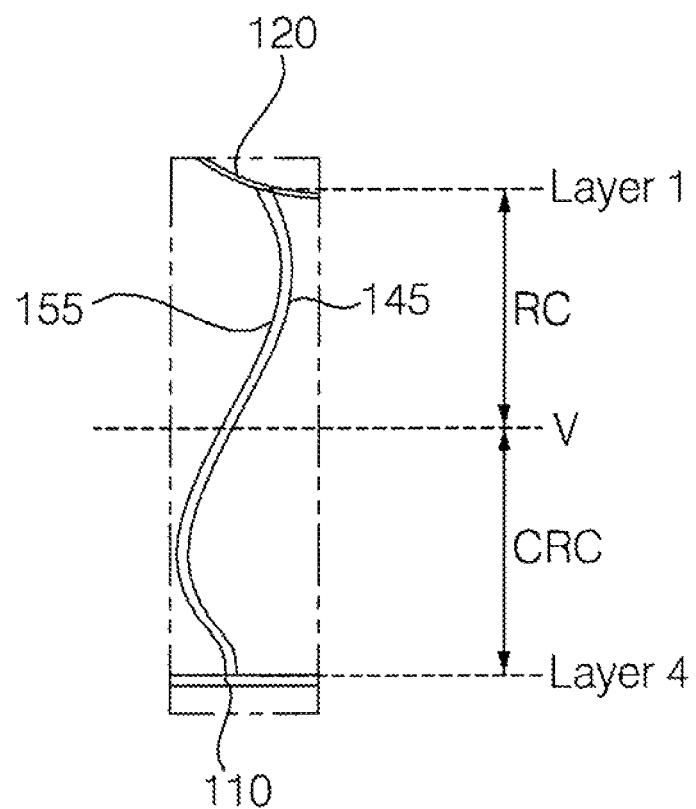
FIG. 10 is a longitudinal sectional view of the blade.

FIG. 2 is a perspective view showing a centrifugal fan according to one embodiment. FIG. 3 is an exploded perspective view of the centrifugal fan shown in FIG. 2. FIG. 4 is a transverse cut-away view of a blade. FIG. 5 is a transverse sectional view of the blade. FIG. 6 is a view showing main factors to define a cross sectional shape and an attachment structure of the blade. FIG. 7 is a view showing factors defined at a point P on a camber line with reference to FIG. 6. FIGS. 8A-8B are a view showing positions of layers marked at the blade and cross sections of the blade taken at the layers. FIG. 9 is a view showing the cross sections of FIGS. 8A-8B are projected onto a single plane in a direction of a rotational axis.

Referring to FIGS. 2 to 4, the centrifugal fan 100 according to one embodiment includes a main plate 110, a shroud 120, and a plurality of blades 130. The main plate 110, the shroud 120 and the plurality of blades 130 may be formed of a metal having plasticity, more particularly, steel. However, it will be appreciated that embodiments are not limited thereto and the aforementioned members may be formed of various other materials, such as synthetic resin or the like.

The main plate 110 is rotated about a rotational axis O by a motor (2, see FIG. 1). Although the main plate 110 may be directly coupled to the rotational shaft of the motor according to an embodiment, the centrifugal fan 100 may further include a hub 160 configured to couple the main plate 110 and the rotational shaft of the motor to each other.

The shroud 120 is spaced apart from the main plate 110 and has a suction opening 121 through which air is introduced in a direction of the rotational axis O. The shroud 120 takes the form of a ring centrally defining the suction opening 121. A diameter of the shroud 120 is gradually increased in a radial direction from an inner circumference of the shroud 120 defining the suction opening 121 and has a maximum value at an outer circumference of the shroud 120 from which an air stream pumped by the blades 130 is discharged. The shroud 120 may have a curved inner surface along which air is guided, the curved inner surface of the shroud 120 being convex toward the main plate 110.

The shroud 120 has a curved surface, a diameter of which gradually increases from the suction opening 121 to the outer circumference of the shroud 120. Although the curved surface may have a constant curvature, preferably, the curvature of the curved surface is changed a plurality of times.

Considering a configuration of the shroud 120 having a curved inner circumferential surface, a vertical distance from an upper edge of the blade 130 coming into contact with the shroud 120 to the main plate 110 has a maximum value at a front edge FE of the blade 130 and has a minimum value at a rear edge RE of the blade 130.

The plurality of blades 130 are arranged in a circumferential direction between the main plate 110 and the shroud 120. Air suctioned through the suction opening 121 of the shroud 120 is moved from a front edge to a rear edge of the respective blades 130 to thereby be discharged outward. The centrifugal fan 100 may include seven blades 130 although this is not essential.

In the plurality of blades 130, considering arbitrary layers (or planes) perpendicular to the rotation axis O, cross sections of the blade 130 taken at the respective layers have front edges FE located on a predetermined common inner circumference and rear edges RE located on a predetermined common outer circumference, the common outer circumference having a greater diameter than that of the common inner circumference. Assuming that one surface of the blade 130 facing the outer side of the centrifugal fan 100 is referred to as a positive pressure surface 131 and the other surface of the blade facing the inner side of the centrifugal fan 100 opposite to the positive pressure surface 131 is a negative pressure surface 132, the front edge FE of the blade 130 is located in front of the rear edge RE in a direction facing the positive pressure surface 131 (or in a rotational direction of the main plate 110).

In the following description, a portion of the blade 130 at which an air stream suctioned through the shroud 120 begins to come into contact with the blade 130 is referred to as the front edge FE and a portion of the blade 130 at which the air stream is separated from the blade 130 is referred to as the rear edge RE.

In addition, the blade 130 that will be described hereinafter is formed by bonding two members 140 and 150 to each other at front edges and rear edges thereof and a cross section of the blade 130 formed as described above has an airfoil shape between the front edges and the rear edges, although embodiments are not necessary to be limited thereto. According to an embodiment, a cross section of the blade 130 may take the form of an airfoil having a leading edge at a front edge thereof and a trailing edge at a rear edge thereof.

The blade 130 may have a three dimensional (3D) shape. In the following description, the 3D shape of the blade is defined as a shape in which, when cross sections of the blade taken at prescribed layers corresponding to prescribed planes perpendicular to the rotational axis O are projected onto a predetermined projection plane in a direction of the rotational axis O, two or more lines among lines interconnecting the front edges FE and the rear edges RE of the respective cross sections in the projection plane do not overlap each other. Here, the lines interconnecting the front edges and the rear edges are defined according to given rules. For example, the lines may be straight lines interconnecting the front edges FE and the rear edges I.E. Alternatively, the lines may be lines connecting equidistant points from the positive pressure surface 131 and the negative pressure surface 132.

Figure 11:
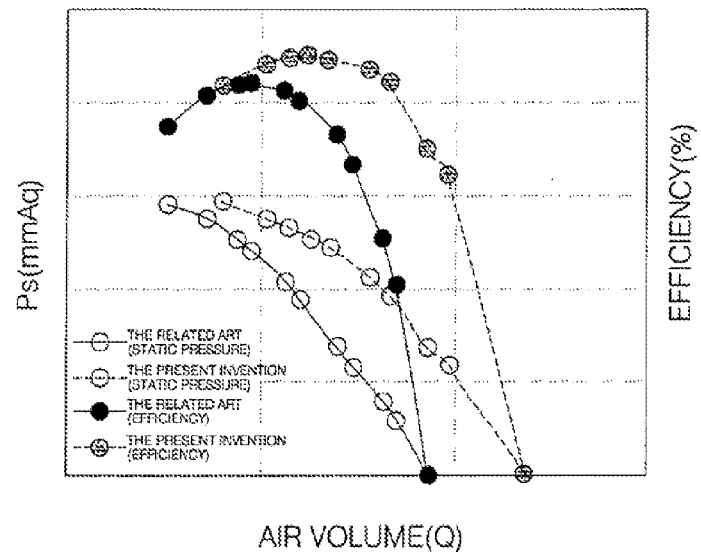
FIG. 11 is a comparative graph showing static pressure Ps and efficiency depending on air volume Q of the centrifugal fan according to one embodiment and a conventional centrifugal fan.
Figure 12:
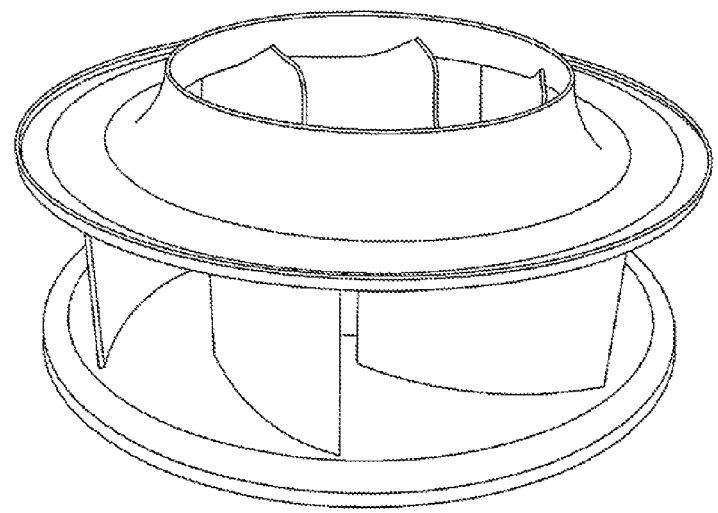
FIG. 12 is a view showing a conventional centrifugal fan.

FIG. 11 is a comparative graph showing static pressure Ps and efficiency depending on air volume Q of the centrifugal fan according to one embodiment and a conventional centrifugal fan. The conventional centrifugal fan is shown in FIG. 12. As will be clearly understood from the drawing, the conventional centrifugal fan does not have a 3D shape as defined above and a blade included in the centrifugal fan has a constant cross sectional shape.

As exemplarily shown in FIG. 11, it was found from experiments that the centrifugal fan 100 according to one embodiment is increased in static pressure Ps as well as efficiency depending on a same air volume beyond that in the conventional centrifugal fan. More particularly, the centrifugal fan 100 has maximum efficiency up to 82% that is rapidly improved than efficiency of approximately 70% based on the same air volume of the related art. Accordingly, it is possible to drive the fan at a lower speed than in the related art on the basis of the same air volume. Such enhancement in performance of the fan may be achieved via improvement in the attachment structure or shape characteristics of the blade. Hereinafter, the blade 130 will be described in more detail.

Referring to FIGS. 4 and 5, the blade 130 includes a positive pressure surface forming member 140 that forms the positive pressure surface (131, see FIG. 2), and a negative pressure surface forming member 150 that forms the negative pressure surface (132 see FIG. 2). The positive pressure surface forming member 140 and the negative pressure surface forming member 150 may be coupled to each other with a space S therebetween. An entire region of the positive pressure surface 131 may be defined by the positive pressure surface forming member 140 and an entire region of the negative pressure surface 132 is defined by the negative pressure surface forming member 150.

The positive pressure surface forming member 140 and the negative pressure surface forming member 150 may be formed by processing a metal sheet. The positive pressure surface forming member 140 (or the negative pressure surface forming member 150) may be formed by processing a metal sheet having an even thickness. In particular, the positive pressure surface forming member 140 or the negative pressure surface forming member 150 may achieve sufficient rigidity with a thickness of approximately 1 mm, which is half or more of a conventional blade formed of a metal sheet having a thickness of 2 mm or more.

More specifically, the positive pressure surface forming member 140 and the negative pressure surface forming member 150 may be fabricated by pressing a metal sheet having plasticity. More particularly, a steel sheet has high plasticity and is easily formed in various shapes and may achieve sufficient corrosion resistance, heat resistance, rigidity and the like according to a content ratio of carbon (C), chrome (Cr), Nickel (Ni) and the like. In particular, a steel centrifugal fan may achieve enhanced rigidity, and thus, is rotatable at a higher rpm than a conventional resin centrifugal fan. The conventional resin centrifugal fan ensures easy formation of a blade having a complicated shape, but has low rigidity. In particular, when the resin centrifugal fan is applied to a large product, the fan may be problematic in terms of stability because of a high risk of damage to blades due to high external static pressure. On the contrary, according to embodiments, as the blade is constructed using the two metal members 140 and 150, it is possible to achieve sufficient rigidity and to provide the blade with a complicated shape for enhancement in performance of the fan.

The positive pressure surface forming member 140 and the negative pressure surface forming member 150 may be bonded to each other at the front edge and the rear edge of the blade 130. Bonding between the positive pressure surface forming member 140 and the negative pressure surface forming member 150 may be implemented at rear surfaces of the respective members. In the following description, a portion of the front edge of the blade 130 where bonding between the positive pressure surface forming member 140 and the negative pressure surface forming member 150 is implemented is referred to as a front edge bonding portion 133 and a portion of the rear edge of the blade 130 where bonding between the positive pressure surface forming member 140 and the negative pressure surface forming member 150 is implemented is referred to as a rear edge bonding portion 134. In addition, the blade 130 has a main body portion 135 between the front edge bonding portion 133 and the rear edge bonding portion 134 and the main body portion 135 inwardly defines a space S. In particular, the main body portion 135 may have an enclosed cross section surrounding the space S.

The positive pressure surface forming member 140 is provided at a front edge thereof with a first front edge bonding surface portion 141 and at a rear edge thereof with a first rear edge bonding surface portion 142. The positive pressure surface forming member is further provided with a first curved surface portion 145 between the first front edge bonding surface portion 141 and the second rear edge bonding surface portion 142. Similarly, the negative pressure surface forming member 150 is provided at a front edge thereof with a second front edge bonding surface portion 151 and at a rear edge thereof with a second rear edge bonding surface portion 152. The negative pressure surface forming member 150 is further provided with a second curved surface portion 155 between the second front edge bonding surface portion 151 and the second rear edge bonding surface portion 152.

Bonding between the first front edge bonding surface portion 141 and the second front edge bonding surface portion 151 is implemented at the front edge bonding portion 133 of the blade 130 and bonding between the first rear edge bonding surface portion 142 and the second rear edge bonding surface portion 152 is implemented at the rear edge bonding portion 134.

A rear surface of the first front edge bonding surface portion 141 (hereinafter referred to as a first front edge bonding surface) and a rear surface of the second front edge bonding surface portion 151 (hereinafter referred to as a second front edge bonding surface) may come into surface contact with each other. The first front edge bonding surface portion 141 and the second front edge bonding surface portion 151 may include bonding surfaces having a corresponding shape. That is, the first front edge bonding surface and the second front edge bonding surface may have substantially a same shape so as to be bonded to each other in close contact.

Likewise, a rear surface of the first rear edge bonding surface portion 142 (hereinafter referred to as a first rear edge bonding surface) and a rear surface of the second rear edge bonding surface portion 152 (hereinafter referred to as a second rear edge bonding surface) may come into surface contact with each other. The first rear edge bonding surface portion 142 and the second rear edge bonding surface portion 152 may include bonding surfaces having a corresponding shape. That is, the first rear edge bonding surface and the second rear edge bonding surface may have substantially a same shape so as to be bonded to each other in close contact.

The main body portion 135 includes the first curved surface portion 145 and the second curved surface portion 155, and the space S is defined between the first curved surface portion 145 and the second curved surface portion 155. The space S has a transverse cross sectional shape defined by a rear surface of the first curved surface portion 145 and a rear surface of the second curved surface portion 155, and a top and bottom of the space is, respectively, defined by the shroud 120 and the main plate 110. The positive pressure surface forming member 140 and the negative pressure surface forming member 150 are independent of each other until they are bonded to each other, and therefore, may be freely processed into different shapes. Accordingly, the first curved surface portion 145 and the second curved surface portion 155 may be shaped to exhibit different curvature variations. In particular, since the shapes of the first curved surface portion 145 and the second curved surface portion 155 determine a shape of the positive pressure surface 131 and a shape of the negative pressure surface 132, respectively, the fact that the shapes of the curved surface portions 145 and 155 are freely determined is very advantageous in terms of enhancement in the performance of the fan. In particular, it is possible to form a positive pressure surface or negative pressure surface including more complicated curved surfaces than that in a case in which a positive pressure surface and a negative pressure surface are formed by bending a single metal sheet (see Japanese Patent Laid-open Publication No. 2000-45997).

In a region of the blade 130 defining the space S, a cross section of the blade may have an airfoil shape. The main body portion 135 defines an airfoil. The entire cross section of an inner circumferential surface of the blade defining the space S has an airfoil shape, but a front edge of the cross section may have a cusp due to bonding between the positive pressure surface forming member 140 and the negative pressure surface forming member 150. Therefore, "airfoil" is defined based on the shape of an outer circumferential surface of the blade 130, and a leading edge LE is defined as being located on a virtual curve that interconnects an outer circumferential surface of the positive pressure surface forming member 140 and an outer circumferential surface of the negative pressure surface forming member 150. In the drawings, "r" designates a radius of curvature at the leading edge LE and a radius of curvature at an upper surface or as lower surface of the airfoil has a minimum value at the leading edge LE. According to an embodiment, the blade may be an airfoil blade provided at a front edge FE thereof with a leading edge LE and at a rear edge RE thereof with a trailing edge TE. In this case, note that the front edge FE and the rear edge RE that will be mentioned below must be understood as the leading edge LE and the trailing edge TE, respectively.

Hereinafter, the main body portion 135 will be described in more detail. The main body portion 135 may have an airfoil or streamlined shape inwardly defining the space S. According to the definition proposed by the National Advisory Committee for Aeronautics (NACA), "airfoil" is configured by a leading edge, a trailing edge, and an upper surface 145a and a lower surface 155a that connect the leading edge and the trailing edge to each other and a shape of the airfoil is determined by various factors. Examples of the factors include a chord line CRL, which is a straight line connecting the leading edge and the trailing edge to each other, and a camber line CBL, which is acquired by connecting equidistant points from the upper surface and the lower surface between the leading edge and the trailing edge. In particular, at the front edge bonding portion 133 and the rear edge bonding portion 134, the camber line is referred to as a boundary where the positive pressure surface forming member 140 and the negative pressure surface forming member 150 come into contact with each other.

Referring to FIGS. 6 and 7, factors required to define the cross sectional shape of the main body portion 135 and arrangement of the main body portion 135 on the main plate 110 are as follows:

Xc: vector drawn along the chord line CRL from the leading edge LE;

Yc: vector perpendicular to the vector Xc at the leading edge LE;

α: angle between the leading edge LE and the trailing edge TE at the rotational axis O;

C(P): circumference passing a point P on the camber line CBL about the rotational axis O;

TC(P): tangent in relation to the circumference C(P) at the point P (FIG. 6 shows the case in which the point P is the leading edge);

TCB(P): tangent in relation to the camber line CBL at the point P (FIG. 6 shows the case in which the point P is the leading edge);

β(P): angle between the tangent TC(P) and the tangent TCB(P);

θ(P): angle between the tangent TCB(P) and the chord line CRL;

γ: angle between the chord line CRL and a line TC at the leading edge LE;

OT: line connecting the center axis O and the trailing edge TE to each other; and Φ: angle between the chord line CRL and the line OT at the trailing edge TE.

In the following description, β(P) is referred to as an attack angle, the attack angle β(LE) at the leading edge LE is referred to as an inlet angle and the attack angle β(TE) at the trailing edge TE is referred to as an outlet angle.

Hereinafter, the shape of the blade 130 will be described in more detail with reference to FIGS. 8A to 10.

Four layers perpendicular to the rotational axis O are shown in FIG. 8A. Cross sections S(L1), S(L2), S(L3) and S(L4) of the blade 130 are, respectively, taken at a first layer Layer 1, a second layer Layer 2, a third layer Layer 3, and a fourth layer Layer 4. The first layer Layer 1, the second layer Layer 2, the third layer Layer 3, and the fourth layer Layer 4, which are required to define the shape of the blade 130, may be freely selected so long as they are taken from the top to the bottom along the rotational axis O in this sequence. In this embodiment, a first cross section S(L1) is taken such that a rear edge RE(L1) thereof meets the shroud 120 and a fourth cross section S(L4) is taken at a portion of the blade 130 where the blade 130 meets the main plate 110.

In the arbitrary cross sections S(L1), S(L2), S(L3), and S(L4) of the blade 130, a camber line may be located between the upper surface 145a of the airfoil and a chord line. The upper surface 145a configuring the positive pressure surface 131 is convex outward of the centrifugal fan 1, and therefore, air velocity is increased at the positive pressure surface 131.

The entire blade 130 acquires a twisted shape in a vertical direction via interrelation between the first cross section S(L1) and the fourth cross section S(L4). In the case of the blade included in the conventional centrifugal fan as exemplarily shown in FIG. 12 or as disclosed in Japanese Patent Laid-open Publication No. 2000-45997, a cross section of the blade near a shroud and a cross section of the blade near a main plate have substantially a same shape, and thus, the centrifugal fan could not effectively deal with variation of airflow from the shroud to the main plate. On the other hand, the centrifugal fan 100 of this embodiment may be designed in such a manner that the first cross section S(L1) taken at the first layer Layer 1 is suitable for flow characteristics at the shroud 120, and the fourth cross section S(L4) taken at the fourth layer Layer 4 is suitable for flow characteristics at the main plate 110 independently of the first cross section S(L1). This has the effect of remarkably improving performance, more particularly, efficiency of the fan as compared to the related art.

A front edge FE(L1) of the first cross section S(L1) close to the shroud 120 may be farther from the rotational axis O than a front edge FE(L4) of the fourth cross section S(L4) close to the main plate 110, and a rear edge RE(L4) of the fourth cross section S(L4) may be farther from the rotational axis O than a rear edge RE(L1) of the first cross section S(L1). In this case, as exemplarily shown in FIG. 9, chord lines of the first cross section S(L1) and the fourth cross section S(L4) cross each other. The chord line of the first cross section S(L1) may cross chord lines of a second cross section S(L2) and a third cross section S(L3) as well as the chord line of the fourth cross section S(L4).

As exemplarily shown in FIGS. 8A-8B, when viewing the blade 130 from a lateral side, the front edge FE or the rear edge RE of the blade 130 has a predetermined inclination angle with respect to the rotational axis O, and more particularly, an upper edge of the blade close to the shroud 120 is located farther from the rotational axis O than a lower edge of the blade close to the main plate 110. Since air velocity is increased with decreasing the distance to the shroud 120, a portion of the blade 130 closer to the shroud 120 must generate greater force. In this way, at least a portion of the blade 130 is shaped such that a cross section of the blade 130 taken at a layer closer to the shroud 120 is located farther from the rotational axis O and this shape increases a linear velocity of the blade 130 at a layer close to the shroud 120, which allows a corresponding portion of the blade 130 to generate greater force.

In addition, generally, as air velocity is faster at a portion of the blade 130 closer to the shroud 120 (hereinafter, the first layer Layer 1 being described by way of example), flow inertia (more particularly, an inertial component in a direction of the rotational axis O) is greater at the first layer Layer 1 and this may cause flow separation at the rear edge of the cross section of the blade taken at the first layer. To solve this problem, the blade 130 according to this embodiment is configured in such a manner that the front edge FE(S1) of the first cross section S(L1) is farther from the rotational axis O than in the related art, which increases a flow path from the suction opening 121 of the shroud 120 to the rear edge RE(L1) of the first cross section S(L1) beyond that in the related art, thereby causing air to overcome flow inertia and be smoothly guided to the rear edge RE(L1). This has the effect of more efficiently restricting flow separation at the rear edge RE of the blade 130.

In addition, the blade 130 may be configured in such a manner that the first cross section S(L1) is located ahead of the fourth cross section S(L4) in a direction opposite to a rotational direction of the main plate 110. More particularly, at least a portion of the rear edge RE of the blade 130 is more deviated in a direction opposite to a rotational direction of the main plate 110 at an upper edge thereof close to the shroud 120 than at a lower edge thereof close to the main plate 110. As described above, even if the blade 130 is shaped in such a manner that a portion of the blade closer to the shroud 120 (for example, the first cross section S(L1)) is farther from the rotational axis O than another portion of the blade (for example, the fourth cross section SL(4)), in the same example, the rear edge RE(L1) of the first cross section S(L1) is located ahead of the rear edge RE(L4) of the fourth cross section S(L4) in a direction opposite to the rotational direction of the main plate 110. Therefore, the rear edge RE(L1) of the first cross section S(L1) is located closer to the rotational axis O than the front edge FE(L1). This has the effect of substantially restricting increase in a blowing diameter of the blade 130 (i.e. a maximum distance from the rotational axis O to the rear edge RE of the blade 130). The rear edge RE(L1) of the first cross section is located ahead of the rear edge RE(L4) of the fourth cross section in a direction opposite to the rotational direction of the main plate 110, and the rear edge RE(L1) of the first cross section among the rear edges RE(L1), RE(L2), RE(L3), and RE(L4) of the respective cross sections is located at the foremost position in a direction opposite to the rotational direction of the main plate 110. This tendency may be equally applied to the front edge FE of the blade 130 and, more particularly, the front edge FE(L1) of the first cross section among the front edges FE(L1), FE(L2), FE(L3), and FB(L4) of the respective cross sections of the blade 130 may be located at the foremost position in a direction opposite to the rotational direction of the main plate 110.

Meanwhile, the front edge FE(L3) of the third cross section may be located ahead of the front edge FE(L4) of the fourth cross section in the rotational direction of the main plate 110. This tendency may be equally applied to the rear edge RE. In this case, the rear edge RE(L3) of the third cross section of the blade 130 may be located ahead of the rear edge RE(L4) of the fourth cross section in the rotational direction of the main plate 110.

In addition, an angle φ between a straight line CRL interconnecting the front edge and the rear edge of the blade 130 and a straight line (OT, see FIG. 6) interconnecting the rotational axis O and the rear edge RE may have the greatest value at the first cross section S(L1) among the respective cross sections S(L1), S(L2), S(L3) and S(L4).

Meanwhile, to ensure that a portion of the blade 130 between the first cross section S(L1) and the fourth cross section S(L4) has a twisted shape, the shape of the blade 130 is determined by the second cross section S(L2) and the third cross section S(L3).

The positive pressure surface 131 and the negative pressure surface 132 between the first cross section S(L1) and the fourth cross section S(L4) are curved surfaces. The positive pressure surface and the negative pressure surface may be curved surfaces each having at least one inflection point between the respective cross sections S(L1), S(L2), S(L3), and S(L4). The blade 130 has a portion RC that is convex in a direction opposite to the rotational axis O (or in a direction facing the positive pressure surface 131) at an upper side of the inflection point and has a portion CRC that is convex toward the rotational axis O (or a direction facing the negative pressure surface 132) at a lower side of the inflection point. For convenience of description, the aforementioned terms may again be defined based on the positive pressure surface 131. That is, the portion RC may be referred to as a convex portion RC because the positive pressure surface 131 of the corresponding portion takes the form of a convex curved surface and the portion CRC may be referred to as a concave portion CRC because the positive pressure surface 131 of the corresponding portion takes the form of a concave curved surface.

The concave portion CRC may guide airflow concentrated on the shroud 120 to the main plate 110, thereby achieving an even velocity of air discharged from an entire section between the upper edge and the lower edge of the blade 130 and also achieving noise reduction and enhancement in the efficiency of the fan.

In addition, as described above, flow separation mainly occurs at a portion of the rear edge LE of the blade 130 close to the shroud 120, and in particular, the rear edge of the negative pressure surface 132 is easily affected by flow inertia. In this embodiment, since the convex portion RC has the convex positive pressure surface 131, flow separation may be restricted by concentrating airflow on the negative pressure surface 132 of another adjacent blade 130. In particular, since the convex portion RC is located close to the shroud 120, it is possible to effectively restrict flow separation at a portion of the rear edge RE of the blade 130 close to the shroud 120.

Meanwhile, a configuration in which an entire region of the blade 130 is divided into an upper convex portion RC and a lower concave portion CRC is possible. In this case, each of the front edge FE and the rear edge RE of the blade 130 may take a form of a curve having at least one inflection point V, and it is not necessary to locate the inflection point of the front edge FE and the inflection point of the rear edge FE in the same layer.

In addition, each of the front edge FE and the rear edge RE of the blade 130 has a highest point of the curve on the convex portion RC (i.e. a point farthest away from the rotational axis O on the curved portion RC) and a lowest point of the curve on the concave portion CRC (i.e. a point shortest from the rotational axis O on the concave portion CRC), and it is not necessary to locate the highest point (or the lowest point) of each curve in the same layer. For example, the lowest point of the curve on the concave portion CRC at the front edge FE of the blade 130 may be located at a higher layer than that of the lowest point of the curve on the concave portion CRC at the rear edge RE.

At the rear edge RE of the blade 130, the highest point is located at the second cross section S(L2) and the lowest point is located at the third cross section S(L3). In this case, a distance between the second cross section S(L2) and the third cross section S(L3) is longer than a distance between the first cross section S(L1) and the second cross section S(L2). This allows air suctioned through the suction opening of the shroud 120 to pass a section of a sufficient length from the highest point to the lowest point and to be naturally transferred from the convex portion RC to the concave portion CRC.

In addition, the concave portion CRC may have different curvatures at the front edge FE and the rear edge RE and this is equally applied to the convex portion RC. In particular, the concave portion CRC may have a greater curvature at the rear edge RE thereof than at the front edge FE thereof.

In the second cross section S(L2), the rear edge RE(2) may be located on a circle C(L2) having a maximum radius Rmax among concentric circles C(P) about the rotational axis O. In addition, in the third blade cross section S(L3) taken at the third layer Layer 3, the rear edge RE(L3) may be located on a circle C(L3) having a minimum radius Rmin. That is, the rear edge RE of the blade 130, which extends from a portion of the blade coming into contact with the shroud 120 to the main plate 110, gradually becomes farther away from the rotational axis O in a given section so as to be at a maximum distance Rmax from the rotational axis O in the second layer Layer 2, and thereafter, gradually approaches the rotational axis O so as to be at a minimum distance Rmin from the rotational axis O in the third layer Layer 3. Then, the rear edge of the blade gradually becomes farther away from the rotational axis O until it again meets the shroud 120 (see RE (L4)).

The rear edge RE of the blade 130 is a curve connecting points RE(L1), RE(L2), RE(L3), and RE(L4) to one another. Considering geometrical arrangement relationship of these points, an inflection point is present between the point RE(L2) and the point RE(L3). In particular, in a section between the inflection point and the point RE(L4), the positive pressure surface 131 is concave toward the rotational axis O, which may advantageously realize increased static pressure and guidance of airflow to the main plate 110.

Meanwhile, considering positions of the front edges FE(L1), FE(L2), FE(L3), and FE(L4) of the respective cross sections of the blade, the front edge FE(L1) at the first layer Layer 1 is located farther from the rotational axis O than the other front edges FE(L2), FE(L3), and FE(L4) and the front edge FE(L3) at the third layer Layer 3 is located closer to the rotational axis O than the other front edges FE(L1), FE(L2), and FE(L4) shown in the drawing. Accordingly, characteristic points of the blade 130 to indicate variation of distance from the rotational axis O to the front edge FE (for example, an inflection point and points having a maximum or minimum distance from the rotation axis O) may not be present in the same layer as characteristic points with regard to the rear edge RE (for example, the points RE(L3) and RE(L2), respectively, having a minimum distance and a maximum distance from the rotational axis O). This is because the blade 130 has a complicated 3D shape.

In the cross sections S(L1), S(L2), S(L3), and SL(4) of the blade, considering the attack angle $\beta$ defined with reference to FIGS. 6 and 7, the attack angle $\beta$ of the first cross section S(L1) is increased from the leading edge LE(L1) to the trailing edge TE(L1), and, likewise, the attack angle $\beta$ of the fourth cross section S(L4) is increased from the leading edge LE(L4) to the trailing edge TE(L4). In the first cross section S(L1), an inlet angle $\beta LE(L1)$ is approximately 16 degrees and an outlet angle $\beta TE(L1)$ is approximately 24 degrees. In addition, in the fourth cross section S(L4), an inlet angle $\beta LE(L4)$ is approximately 10 degrees and an outlet angle $\beta TE(L4)$ is approximately 38 degrees.

Since the velocity of air discharged along the main plate 110 differs from the velocity of air passing through the shroud 120, variation of the attack angle $\beta$ from the upper edge of the blade 130 connected to the shroud 120 to the lower edge of the blade connected to the main plate 110 has a great effect on the efficiency of the fan. Accordingly, when air moves in the shortest path or in an airflow direction along the positive pressure surface 131 of the blade 130 from the leading edge LE(L1) of the first cross section S(L1) to the trailing edge TE(L4) of the fourth cross section S(L4), the attack angle may be preferably gradually increased and, in this case, the outlet angle PTE(L4) of the fourth cross section S(L4) may have a maximum value.

The invention claimed is:

1. A centrifugal fan, comprising:
a main plate configured to be rotated about a rotational axis;
a shroud having a suction opening, through which air is suctioned in; and
a plurality of blades arranged between the main plate and the shroud to allow the air suctioned in through the suction opening to flow from a front edge to a rear edge of each blade with respect to a rotational direction of the main plate, wherein, when defining a first cross section, a second cross section, a third cross section, and a fourth cross section of each blade sequentially taken at layers from the shroud to the main plate, a front edge of the first cross section is located farther away from the rotational axis than a front edge of the fourth cross section, and a rear edge of the first cross section is located closer to the rotational axis than a rear edge of the fourth cross section, and wherein, among rear edges of the respective cross sections, a rear edge of the second cross section is located farthest away from the rotational axis and a rear edge of the third cross section is located closest to the rotational axis.

2. The centrifugal fan according to claim 1, wherein the front edge of the first cross section of each blade is located ahead of the front edge of the fourth cross section in a direction opposite to the rotational direction of the main plate.

3. The centrifugal fan according to claim 2, wherein, among front edges of the respective cross sections, the front edge of the first cross section is located at a foremost position in the direction opposite to the rotational direction of the main plate.

4. The centrifugal fan according to claim 2, wherein the rear edge of the first cross section is located ahead of the rear edge of the fourth cross section in the direction opposite to the rotational direction of the main plate.

5. The centrifugal fan according to claim 4, wherein, among the respective cross sections of each blade, the rear edge of the first cross section is located at a foremost position in the direction opposite to the rotational direction of the main plate.

6. The centrifugal fan according to claim 1, wherein a front edge of the third cross section of each blade is located ahead of the front edge of the fourth cross section in the rotational direction of the main plate.

7. The centrifugal fan according to claim 6, wherein the rear edge of the third cross section of the blade is located ahead of the rear edge of the fourth cross section in the rotational direction of the main plate.

8. The centrifugal fan according to claim 1, wherein an angle between a straight line that interconnects the front edge and the rear edge of each blade and a straight line that interconnects the rear edge and the rotational axis has a maximum value at the first cross section among the respective cross sections.

9. The centrifugal fan according to claim 1, wherein, when the respective cross sections of each blade are projected onto a common projection plane in a direction of the rotational axis, a straight line that interconnects the front edge and the rear edge of the first cross section crosses all straight lines that interconnect the front edges and the rear edges of the second, third, and fourth cross sections.

10. The centrifugal fan according to claim 1, wherein the first cross section meets the shroud at the rear edge of the shroud.

11. The centrifugal fan according to claim 1, wherein the fourth cross section is a portion of each blade where the blade meets the main plate.

12. The centrifugal fan according to claim 1, wherein a cross section of each blade between the front edge and the rear edge thereof takes the form of an airfoil.

13. The centrifugal fan according to any claim 1, wherein each blade includes:
a positive pressure surface forming member that forms a positive pressure surface; and
a negative pressure surface forming member that forms a negative pressure surface.

14. A centrifugal fan, comprising:
a main plate configured to be rotated about a rotational axis;
a shroud having a suction opening, through which air is suctioned in; and
when defining a first cross section, a second cross section, a third cross section, and a fourth cross section of each blade sequentially taken at planar layers, substantially perpendicular to the rotational axis, from the shroud to the main plate, at the rear edge of each blade a first section between the first cross section and the second cross section gradually becomes farther away from the rotational axis, at the rear edge of each blade a second section between the second cross section and the third cross section gradually approaches the rotational axis, and at the rear edge of each blade a third section between the third cross section and the fourth cross section again gradually becomes farther away from the rotational axis.

15. The centrifugal fan according to claim 14, wherein, among rear edges of the respective cross sections, the rear edge of the second cross section is located farthest away from the rotational axis.

16. The centrifugal fan according to claim 14, wherein, among rear edges of the respective cross sections, the rear edge of the third cross section is located at a foremost position in the rotational direction of the main plate.

17. The centrifugal fan according to claim 14, wherein, among rear edges of the respective cross sections, the rear edge of the first cross section is located at a foremost position in a direction opposite to the rotational direction of the main plate.

18. The centrifugal fan according to claim 14, wherein a distance between the second cross section and the third cross section is greater than a distance between the first cross section and the second cross section.

19. The centrifugal fan according to claim 14, wherein each blade includes:
a positive pressure surface forming member that forms a positive pressure surface; and
a negative pressure surface forming member that forms a negative pressure surface.

20. A centrifugal fan, comprising:
a main plate configured to be rotated about a rotational axis;
a shroud having a suction opening, through which air is suctioned in; and
a plurality of blades arranged between the main plate and the shroud to allow the air suctioned in through the suction opening to flow from a front edge to a rear edge of each blade with respect to a rotational direction of the main plate, wherein a longitudinal cross section of each blade is convex in a direction opposite to the rotational axis at a portion of the blade near the shroud and is convex toward the rotational axis at a portion of the blade near the main plate, wherein, when defining two predetermined cross sections sequentially taken at planar layers, substantially perpendicular to the rotational axis, from the shroud to the main plate, the two cross sections projected onto a predetermined projection plane along the rotational axis cross each other, and wherein, among the two cross sections of each blade, one of the two cross sections closer to the shroud than the other of the two cross sections further crosses a cross section, having a longest distance from a rear edge thereof to the rotational axis, included in the portion that is convex in the direction opposite to the rotational axis, and a cross section, having a shortest distance from a rear edge thereof to the rotational axis, included in the portion that is convex toward the rotational axis.

21. The centrifugal fan according to claim 20, wherein each blade includes a portion at which the front edge becomes farther away from the rotational axis with decreasing distance from the shroud.

22. The centrifugal fan according to claim 20, wherein, among the two cross sections of each blade, a front edge of the cross section closer to the shroud is located farther from the rotational axis than a front edge of the other cross section closer to the main plate, and wherein a rear edge of the cross section closer to the shroud is located closer to the rotational axis than the a rear edge of the other cross section closer to the main plate.

23. The centrifugal fan according to claim 22, wherein the rear edge of the cross section closer to the shroud is located ahead of the rear edge of the other cross section closer to the main plate in a direction opposite to the rotational direction of the main plate.

24. The centrifugal fan according to claim 20, wherein each blade includes:
- a positive pressure surface forming member that forms a positive pressure surface; and
- a negative pressure surface forming member that forms a negative pressure surface.

* * * * *